United States Patent [19]

Watanabe et al.

[11] Patent Number: 4,909,960

[45] Date of Patent: Mar. 20, 1990

[54] SEMICONDUCTOR RESIN COMPOSITION

[75] Inventors: Kiyoshi Watanabe; Toshio Shiina; Yukio Shimazaki; Hideki Yagyu; Katsutoshi Hanawa; Moritada Marumo, all of Ibaraki, Japan

[73] Assignee: Hitachi Cable Ltd., Tokyo, Japan

[21] Appl. No.: 249,532

[22] Filed: Sep. 27, 1988

[30] Foreign Application Priority Data

Mar. 29, 1988 [JP] Japan .................................. 63-75742

[51] Int. Cl.$^4$ ............................................. H01B 1/06
[52] U.S. Cl. .................................... 252/511; 257/502; 257/510; 524/495; 524/496
[58] Field of Search ................ 252/511; 524/495, 496, 524/502, 510

[56] References Cited

U.S. PATENT DOCUMENTS

| | | | |
|---|---|---|---|
| 4,246,142 | 1/1981 | Ohgchin | 252/511 |
| 4,395,362 | 7/1983 | Satoh et al. | 252/511 |
| 4,664,900 | 5/1987 | Miyazaki et al. | 252/510 |
| 4,696,765 | 9/1987 | Kakizaki et al. | 252/511 |

Primary Examiner—Josephine Barr
Attorney, Agent, or Firm—Sughrue, Mion, Zinn, MacPeak & Seas

[57] ABSTRACT

A semiconductive resin composition comprising 100 parts by weight of a polymer component comprising an ethylene-based copolymer, an ethylene-propylene rubber, and a low molecular weight polyethylene having an average molecular weight of 1,000 to 4,000 and 40 parts by weight or more of electroconductive carbon black.

13 Claims, No Drawings

SEMICONDUCTOR RESIN COMPOSITION

FIELD OF THE INVENTION

This invention relates to a semiconductive resin composition suitable for forming internal- or external-semiconductive layers of high voltage power cables having polyethylene or crosslinked polyethylene as insulator, and, especially, to a semiconductive resin composition which can provide improved water tree resistance.

BACKGROUND OF THE INVENTION

High voltage power cables using polyethylene or crosslinked polyethylene as insulator are provided with an internal semiconductive layer surrounding the outer periphery of the conductor and an external semiconductive layer surrounding the outer periphery of the insulator. Internal semiconductive layers relax heterogeneous electrical stress attributed to irregularities in the twisted wires in conductors, and also increase adhesion between the conductor and the insulator. External semiconductive layers homogenize electrical stress on the insulator surface.

Generally, for forming the semiconductive layers ethylene-based copolymer used as base polymer, such as ethylene-vinyl acetate copolymer and ethylene-ethyl acrylate copolymer, mixed with conductive carbon black are used.

When the conductive carbon black is not sufficiently dispersed in the base polymer, coarse grains are formed by coagulation of the carbon black particles. When the grains are formed in the interface between the insulator and the semiconductor layers, water tree deterioration initiates from these grains.

JP-A-59-8216 discloses a method of improving the water tree resistance by blending ethylene-propylene rubber with an ethylene-based copolymer, to prevent the formation of grains. (The term "JP-A" as used herein means an "unexamined published Japanese patent application".) According to this method, a large shearing stress is generated at the time of dispersing the conductive carbons in the polymer by using kneaders such as Bambury mixer so that the grains are finely divided to become harmless.

The above composition is, however, so viscous that a commonly used manufacturing method for high voltage cables, i.e., the common extruding method cannot be applied. In the common extruding method, the semiconductive layer and the insulator layer are simultaneously extruded on the outer surface of the conductor using a common crosshead. This method avoids disconformity between the semiconductor and the insulating layers. Since the common crosshead is used for the both layers, the extruding temperature of the semiconductive layer is restricted to be the same as that of the insulator layer or lower. When corsslinked polyethylene insulator is used, the temperature is limited to 130° C. or less. In that case of the above composition comprising an ethylene-based copolymer blended with an ethylene-propylene rubber, the viscosity is extremely high so that extrusion becomes very difficult.

SUMMARY OF THE INVENTION

The present invention was made to solve the above problems. Therefore it is an object of the present invention to provide a semiconductive resin composition having excellent extrusion workability which suppress water tree formation.

A semiconductive resin composition according to the present invention comprises 100 parts by weight of a polymer comprising an ethylene-based copolymer, an ethylene-propylene rubber, and a low molecular weight polyethylene having an average molecular weight of 1,000 to 4,000, and 40 parts by weight or more of conductive carbon black.

DETAILED DESCRIPTION OF THE INVENTION

Ethylene-based copolymers suitably used in the present invention include ethylene-vinyl acetate copolymers, ethylene-ethyl acrylate copolymer, and ethylene-methyl methacrylate copolymer.

Either ethylene-propylene copolymers or ethylene-propylene-unconjugated diene terpolymers are useful ethylene-propylene rubbers.

A chief feature of the present invention resides in that a low molecular weight polyethylene having an average molecular weight between 1,000 and 4,000 is blended as a third component in addition to an ethylene-based copolymer and an ethylene-propylene rubber. By this viscosity is lowered to enable common extrusion while maintaining water tree resistance.

The low molecular weight polyethylene to be used is a waxy material having a softening point between 100° and 130° C. Waxy materials such as paraffin wax or micro-crystalline wax having softening or melting points lower than the above temperature range melt in the initial steps of kneading with carbon black, so that no high shearing stress can be obtained. Therefore, though viscosity is lowered, the grains are not reduced and the water tree resistance cannot be maintained. A low molecular weight propylene, which has a high softening point, does not melt at the common extrusion temperature and generates sufficiently high shearing stress to greatly reduce the amount of the grains, but extrusion operation becomes impossible due to the high viscosity. Further, stearic acid amides or zinc stearates having softening or melting points between 100° and 130° C., but with low molecular weights, are prone to move to the surface of the semiconductor layer. Also, they act as external lubricants between the processing machine and the material to avoid the sticking. Therefore, they are unsuitable for lowering the viscosity.

Preferably, the composition should be, from 40 to 90% of ethylene copolymer, from 5 to 30 wt% of an ethylene-propylene rubber, and from 5 to 30 wt% of a low molecular weight polyethylene. When the ethylene-propylene rubber content is too low, the grain formation and water trees are not effectively suppressed, whereas too high a content makes the common extrusion unoperable due to the increased viscosity. The content of the low molecular weight polyethylene varies depending on the content of the ethylene-propylene rubber. Too low a content is insufficient to effectively lower the viscosity, and too high a content fails to suppress the grain formation.

Carbon blacks used in the present invention include those of common types used as conductivity imparting agent, such as furnace black, acetylene black, and Ketjen black. These can be used alone or in combinations of two or more thereof. Most effective among them in decreasing the grain formation is the furnace carbon black with arithmetic mean particle size of 25 to 40 mµ, iodine adsorption of 40 to 60 mg/g, DBP oil absorption (by JIS A method) of 120 to 150 ml/100 g. The arithmetic mean particle size is that obtained by electron microscopic observation. Particles smaller than 25 mµ increases viscosity so that extrusion workability is decreased, and particles having the particle size exceeding 40 mµ tend to give insufficient conductivity. In addition, a composition with iodine adsorption of less than 40 mg/g is deficient in conductivity, whereas that exceeding 60 mg/g is deteriorated in extrusion workability due to a too high viscosity. DBP oil absorption is measured by JIS A method. When it is lower than 120 ml/100 g, conductivity obtained is not high enough and a value higher than 150 ml/100 g increases the viscosity of the composition and adversely affects the extrusion workability. Acetylene black may be used together with above furnace black so far as the viscosity of the composition is not considerably increased.

The addition of the conductive carbon black should be 40 parts by weight or higher per 100 parts by weight of the polymer component. If the addition is lower than this lower limit, conductivity obtained is not high enough.

Lubricants, antioxidants, and inhibitors against metallic damage and deterioration, may be added to the composition of the present invention. Preferable lubricants are those acting as external lubricants which prevents adhesion of the composition to the processing machine. Examples of such lubricants are aliphatic alcohols, esters of fatty acids, metal salts of fatty acids, and fatty acid amides. They can be used independently or in combinations of two or more. Examples of antioxidants include thiobisphenols, alkylidenebisphenols, alkylphenol, hydroxybenzyl compounds, aminophenols, hydroxyphenyl propionates, sec-aromatic amines, thioethers, phosphites, phosphonites. They may be used independently or in combinations of two or more thereof.

The composition of the present invention may be crosslinkable or noncrosslinkable. In the case of the former, generally used as the crosslinking agents are organic peroxides. Examples of such agents include dialkyl peroxides, such as dicumyl peroxides, 1,3-bis(-tert-butylperoxyisopropyl)benzene, 2,2-dimethyl-2,5-di(tert-butylperoxy)hexine-3.

The present invention is now illustrated in greater detail with reference to nonlimiting Examples and Comparative Examples. In these examples, all percents and parts are by weight unless otherwise indicated.

EXAMPLES

The components were kneaded with a Bambury mixer to give the compositions of Examples 1 to 13 and Comparative Examples 1 to 8 shown below. Each compound thus obtained was fed to an extruder to form internal and external semiconductive layers together with polyethylene insulator on a copper twisted wire conductor having across sectional area of 150 mm² by extrusion coating using common head. The thickness of the layers were 1 mm each for the internal and the external semiconductive layers and 4 mm for the polyethylene insulator layer. The extrusion temperature for both the internal and external semiconductive layers were 120° C. After extrusion, crosslinking was effected by heating to give a crosslinked polyethylene insulated power cables. The insulating layer was prepared by mixing 100 parts of a low density polyethylene (with density of 0.920 g/cm³ and melt index of 1.0 g/10 min.) with 2.5 parts of dicumyl peroxide as the crosslinking agent and 0.25 parts of 4,4'-thio-bis(3-methyl-6-tert-butylphenol) as the anti-oxidant.

EXAMPLE 1

| | |
|---|---|
| Ethylene-vinyl acetate copolymer (containing 14% of vinyl acetate; with melt index of 15) | 90 parts |
| Ethylene-propylene rubber (with Mooney viscosity of $ML_{1+4} = 40$) | 5 parts |
| Low molecular weight polyethylene (average molecular weight of 1,500; softening point of 105° C.) | 5 parts |
| 4,4'-Thio-bis(3-methyl-6-tert-butyl-phenol) | 0.5 parts |
| 1,3-Bis(tert-butylperoxyisopropyl)benzene | 0.5 parts |
| Acetylene black | 65 parts |

EXAMPLE 2

| | |
|---|---|
| Ethylene-vinyl acetate copolymer (containing 14% of vinyl acetate; with melt index of 15) | 85 parts |
| Ethylene-propylene rubber (with Mooney viscosity of $ML_{1+4} = 40$) | 10 parts |
| Low molecular weight polyethylene (average molecular weight of 1,500; softening point of 105° C.) | 5 parts |
| 4,4'-Thio-bis(3-methyl-6-tert-butylphenol) | 0.5 parts |
| 1,3-Bis(tert-butylperoxyisopropyl)benzene | 0.5 parts |
| Acetylene black | 65 parts |

EXAMPLE 3

| | |
|---|---|
| Ethylene-vinyl acetate copolymer (containing 14% of vinyl acetate; with melt index of 15) | 75 parts |
| Ethylene-propylene rubber (with Mooney viscosity of $ML_{1+4} = 40$) | 10 parts |
| Low molecular weight polyethylene (average molecular weight of 1,500; softening point of 105° C.) | 15 parts |
| 4,4'-Thio-bis(3-methyl-6-tert-butylphenol) | 0.5 parts |
| 1,3-Bis(tert-butylperoxyisopropyl)benzene | 0.5 parts |
| Acetylene black | 65 parts |

EXAMPLE 4

| | |
|---|---|
| Ethylene-vinyl acetate copolymer (containing 14% of vinyl acetate; with melt index of 15) | 60 parts |
| Ethylene-propylene rubber (with Mooney viscosity of $ML_{1+4} = 40$) | 20 parts |
| Low molecular weight polyethylene (average molecular weight of 2,000; softening point of 107° C.) | 20 parts |
| 4,4'-Thio-bis(3-methyl-6-tert-butylphenol) | 0.5 parts |
| 1,3-Bis(tert-butylperoxyisopropyl)benzene | 0.5 parts |
| Acetylene black | 65 parts |

EXAMPLE 5

| | |
|---|---|
| Ethylene-vinyl acetate copolymer (containing 14% of vinyl acetate; with melt index of 15) | 40 parts |
| Ethylene-propylene rubber (with Mooney viscosity of $ML_{1+4} = 40$) | 30 parts |
| Low molecular weight polyethylene (average molecular weight of 1,500; softening point of 105° C.) | 30 parts |
| 4,4'-Thio-bis(3-methyl-6-tert-butylphenol) | 0.5 parts |
| 1,3-Bis(tert-butylperoxyisopropyl)benzene | 0.5 parts |

EXAMPLE 6

| | |
|---|---|
| Ethylene-ethyl acrylate copolymer (containing 17% of ethyl acrylate; with melt index of 18) | 80 parts |
| Ethylene-propylene rubber (with Mooney viscosity of $ML_{1+4} = 40$) | 10 parts |
| Low molecular weight polyethylene (average molecular weight of 4,000; softening point of 126° C.) | 10 parts |
| 4,4'-Thio-bis(3-methyl-6-tert-butylphenol) | 0.5 parts |
| 1,3-Bis(tert-butylperoxyisopropyl)benzene | 0.5 parts |
| Acetylene black | 65 parts |

EXAMPLE 7

| | |
|---|---|
| Ethylene-ethyl acrylate copolymer (containing 17% of ethyl acrylate; with melt index of 18) | 60 parts |
| Ethylene-propylene rubber (with Mooney viscosity of $ML_{1+4} = 40$) | 20 parts |
| Low molecular weight polyethylene (average molecular weight of 4,000; softening point of 126° C.) | 20 parts |
| 4,4'-Thio-bis(3-methyl-6-tert-butylphenol) | 0.5 parts |
| 1,3-Bis(tert-butylperoxyisopropyl)benzene | 0.5 parts |
| Acetylene black | 65 parts |

EXAMPLE 8

| | |
|---|---|
| Ethylene-vinyl acetate copolymer (containing 14% of vinyl acetate; with melt index of 15) | 90 parts |
| Ethylene-propylene rubber (with Mooney viscosity of $ML_{1+4} = 40$) | 5 parts |
| Low molecular weight polyethylene (average molecular weight of 1,500; softening point of 105° C.) | 5 parts |
| 4,4'-Thio-bis(3-methyl-6-tert-butyl-phenol) | 0.5 parts |
| 1,3-Bis(tert-butylperoxy-isopropyl)benzene | 0.5 parts |
| Furnace carbon black (with arithmetic mean particle size of 30 mµ; iodine adsorption of 53 mg/g; DBP oil absorption of 133 ml/100 g) | 75 parts |

EXAMPLE 9

| | |
|---|---|
| Ethylene-vinyl acetate copolymer (containing 14% of vinyl acetate; with melt index of 15) | 85 parts |
| Ethylene-propylene rubber (with Mooney viscosity of $ML_{1+4} = 40$) | 10 parts |
| Low molecular weight polyethylene (average molecular weight of 1,500; softening point of 105° C.) | 5 parts |
| 4,4'-Thio-bis-(3-methyl-6-tert-butylphenol) | 0.5 parts |
| 1,3-Bis(tert-butylperoxyisopropyl)benzene | 0.5 parts |
| Furnace carbon black (with arithmetic mean particle size of 30 mµ; iodine adsorption of 53 mg/g; DBP oil absorption of 133 ml/100 g) | 75 parts |

EXAMPLE 10

| | |
|---|---|
| Ethylene-ethyl acrylate copolymer (containing 17% of ethyl acrylate; with melt index of 18) | 60 parts |
| Ethylene-propylene rubber (with Mooney viscosity of $ML_{1+4} = 40$) | 20 parts |
| Low molecular weight polyethylene (average molecular weight of 4,000; softening point of 126° C.) | 20 parts |
| 4,4'-Thio-bis(3-methyl-6-tert-butylphenol) | 0.5 parts |
| 1,3-Bis(tert-butylperoxyisopropyl)benzene | 0.5 parts |
| Furnace carbon black (with arithmetic mean particle size of 30 mµ; iodine adsorption of 53 mg/g; DBP oil absorption of 133 ml/100 g) | 75 parts |

EXAMPLE 11

| | |
|---|---|
| Ethylene-vinyl acetate copolymer (containing 14% of vinyl acetate; with melt index of 15) | 85 parts |
| Ethylene-propylene rubber (with Mooney viscosity of $ML_{1+4} = 40$) | 10 parts |
| Low molecular weight polyethylene (average molecular weight of 1,500; softening point of 105° C.) | 5 parts |
| 4,4'-Thio-bis(3-methyl-6-tert-butylphenol) | 0.5 parts |
| 1,3-Bis(tert-butylperoxyisopropyl)benzene | 0.5 parts |
| Furnace carbon black (with arithmetic mean particle size of 22 mµ; iodine adsorption of 104 mg/g; DBP oil absorption of 129 ml/100 g) | 75 parts |

EXAMPLE 12

| | |
|---|---|
| Ethylene-vinyl acetate copolymer (containing 14% of vinyl acetate; with melt index of 15) | 85 parts |
| Ethylene-propylene rubber (with Mooney viscosity of $ML_{1+4} = 40$) | 10 parts |
| Low molecular weight polyethylene (average molecular weight of 1,500; softening point of 105° C.) | 5 parts |
| 4,4'-Thio-bis(3-methyl-6-tert-butylphenol) | 0.5 parts |
| 1,3-Bis(tert-butylperoxyisopropyl)benzene | 0.5 parts |
| Furnace carbon black (with arithmetic mean particle size of 43 mµ; iodine adsorption of 44 mg/g; DBP oil absorption of 115 ml/100 g) | 75 parts |

EXAMPLE 13

| | |
|---|---|
| Ethylene-vinyl acetate copolymer (containing 14% of vinyl acetate; with melt index of 15) | 85 parts |
| Ethylene-propylene rubber (with Mooney viscosity of $ML_{1+4} = 40$) | 10 parts |
| Low molecular weight polyethylene (average molecular weight of 1,500; softening point of 105° C.) | 5 parts |
| 4,4'-Thio-bis(3-methyl-6-tert-butylphenol) | 0.5 parts |
| 1,3-Bis(tert-butylperoxyisopropyl)benzene | 0.5 parts |
| Furnace carbon black (with arithmetic mean particle size of 34 mµ; iodine adsorption of 51 mg/g; DBP oil absorption of 103 ml/100 g) | 75 parts |

COMPARATIVE EXAMPLE 1

| | |
|---|---|
| Ethylene-vinyl acetate copolymer (containing 14% of vinyl acetate; with melt index of 15) | 100 parts |

-continued

| | |
|---|---|
| 4,4'-Thio-bis(3-methyl-6-tert-butylphenol) | 0.5 parts |
| 1,3-Bis(tert-butylperoxyisopropyl)benzene | 0.5 parts |
| Acetylene black | 65 parts |

COMPARATIVE EXAMPLE 2

| | |
|---|---|
| Ethylene vinyl acetate copolymer (containing 14% of vinyl acetate; with melt index of 15) | 85 parts |
| Ethylene-propylene rubber (with Mooney viscosity of $ML_{1+4} = 40$) | 15 parts |
| 4,4'-Thio-bis(3-methyl-6-tert-butylphenol) | 0.5 parts |
| 1,3-Bis(tert-buty-peroxyisopropyl)benzene | 0.5 parts |
| Acetylene black | 65 parts |

COMPARATIVE EXAMPLE 3

| | |
|---|---|
| Ethylene-vinyl acetate copolymer (containing 14% of vinyl acetate; with melt index of 15) | 85 parts |
| Ethylene-propylene rubber (with Mooney viscosity of $ML_{1+4} = 40$) | 10 parts |
| Low molecular weight polyethylene (average molecular weight of 5,000; softening point of 111° C.) | 5 parts |
| 4,4'-Thio-bis(3-methyl-6-tert-butylphenol) | 0.5 parts |
| 1,3-Bis(tert-butylperoxyisopropyl)benzene | 0.5 parts |
| Acetylene black | 65 parts |

COMPARATIVE EXAMPLE 4

| | |
|---|---|
| Ethylene-vinyl acetate copolymer (containing 14% of vinyl acetate; with melt index of 15) | 80 parts |
| Ethylene-propylene rubber (with Mooney viscosity of $ML_{1+4} = 40$) | 10 parts |
| Paraffin wax (melting point of 66° C.) | 10 parts |
| 4,4'-Thio-bis(3-methyl-6-tert-butylphenol) | 0.5 parts |
| 1,3-Bis(tert-butylperoxyisopropyl)benzene | 0.5 parts |
| Acetylene black | 65 parts |

COMPARATIVE EXAMPLE 5

| | |
|---|---|
| Ethylene-vinyl acetate copolymer (containing 14% of vinyl acetate; with melt index of 15) | 80 parts |
| Ethylene-propylene rubber (with Mooney viscosity of $ML_{1+4} = 40$) | 10 parts |
| Microcrystalline Wax (melting point of 90° C.) | 10 parts |
| 4,4'-Thio-bis(3-methyl-6-tert-butylphenol) | 0.5 parts |
| 1,3-Bis(tert-butylperoxyisopropyl)benzene | 0.5 parts |
| Acetylene black | 65 parts |

COMPARATIVE EXAMPLE 6

| | |
|---|---|
| Ethylene-vinyl acetate copolymer (containing 14% of vinyl acetate; with melt index of 15) | 88 parts |
| Ethylene-propylene rubber (with Mooney viscosity of $ML_{1+4} = 40$) | 10 parts |
| Zinc stearate (melting point of 120° C.) | 10 parts |
| 4,4'-Thio-bis(3-methyl-6-tert-butyl-phenol) | 2 parts |
| 1,3-Bis(tert-butylperoxyisopropyl)benzene | 0.5 parts |
| Acetylene black | 65 parts |

COMPARATIVE EXAMPLE 7

| | |
|---|---|
| Ethylene vinyl acetate copolymer (containing 14% of vinyl acetate; with melt index of 15) | 80 parts |
| Ethylene-propylene rubber (with Mooney viscosity of $ML_{1+4} = 40$) | 10 parts |
| Low molecular weight polyethylene (softening point of 145° C.) | 10 parts |
| 4,4'-Thio-bis(3-methyl-6-tert-butylphenol) | 0.5 parts |
| 1,3-Bis(tert-butylperoxyisopropyl)benzene | 0.5 parts |
| Acetylene black | 65 parts |

COMPARATIVE EXAMPLE 8

| | |
|---|---|
| Ethylene-vinyl acetate copolymer (containing 14% of vinyl acetate; with melt index of 15) | 85 parts |
| Ethylene-propylene rubber (with Mooney viscosity of $ML_{1+4} = 40$) | 10 parts |
| Low molecular weight polyethylene (average molecular weight of 1,500; softening point of 105° C.) | 5 parts |
| 4,4'-Thio-bis(3-methyl-6-tert-butylphenol) | 0.5 parts |
| 1,3-Bis(tert-butylperoxyisopropyl)benzene | 0.5 parts |
| Acetylene black | 35 parts |

The compositions given above and the cables prepared by using them were evaluated and the results are given in Table 1 below.

Evaluations were made according to the following.

Extrusion workability: the state of cable at extrusion was observed, i.e., it was decided whether common extrusion was applicable or not.

Grain (particle generation): a compound kneaded with a Bambury mixer was extruded into a 1 mm thick and 30 mm wide tape using an extruder with a barrel diameter of 30 mm, and the surface of the tape was visually observed.

Water tree: water was poured into the conductor of the cable and kept the cable was immersed in water while applying alternating voltage 15 kV at 50 Hz between the conductor and the water electrode, at 90° C. for 18 months. The insulator was then spiral-cut, boiled in an aqueous Methylene Blue solution, and the interfaces between the insulator and the internal semiconductor layer and between the insulator and the external semiconductor layer were subjected to microscopic observation to investigate whether water trees were formed or not.

Volume resistivity: measurements following the AEIC-CS5-82 was performed on the outside semiconductive layer.

TABLE 1

| | | Extrusion workability | particles (piece/200 cm²) | Water tree | Volume resistivity ($\Omega \cdot cm$) |
|---|---|---|---|---|---|
| Examples of the Invention | 1 | good | 2 | nil | $6 \times 10^1$ |
| | 2 | good | 2 | nil | $9 \times 10^1$ |
| | 3 | good | 2 | nil | $3 \times 10^2$ |
| | 4 | good | 1 | nil | $4 \times 10^2$ |
| | 5 | good | 3 | nil | $9 \times 10^2$ |
| | 6 | good | 2 | nil | $8 \times 10^1$ |
| | 7 | good | 2 | nil | $4 \times 10^2$ |
| | 8 | good | 2 | nil | $7 \times 10^1$ |
| | 9 | good | 4 | nil | $1 \times 10^2$ |
| | 10 | good | 5 | nil | $5 \times 10^2$ |
| | 11 | good | 7 | nil | $1 \times 10^3$ |
| | 12 | good | 7 | nil | $5 \times 10^3$ |
| | 13 | good | 6 | nil | $3 \times 10^3$ |

TABLE 1-continued

|  |  | Extrusion workability | particles (piece/ 200 cm²) | Water tree | Volume resistivity (Ω · cm) |
|---|---|---|---|---|---|
| Comparative Examples | 1 | good | 25 | Observed | 2 × 10¹ |
|  | 2 | unextrudable | 2 | Un-measurable | Un-measurable |
|  | 3 | unextrudable | 4 | Un-measurable | Un-measurable |
|  | 4 | good | 22 | Observed | 8 × 10¹ |
|  | 5 | good | 21 | Observed | 9 × 10¹ |
|  | 6 | unextrudable | 5 | Un-measurable | Un-measurable |
|  | 7 | unextrudable | 3 | Un-measurable | Un-measurable |
|  | 8 | good | 21 | Observed | 10⁶ < |

Samples 1 to 13 of the present invention were readily manufactured by the common extrusion, showed extremely low tendency to form grains, were completely free from water trees, and had low volume resistivity.

Comparative Example 1 using only ethylene-vinyl acetate copolymer as the base polymer formed a large amount of grains and water trees. Comparative Example 2 was the case where ethylene-vinyl acetate copolymer and ethylene-propylene rubber were used as the base polymer. In this case, the viscosity was too high that the common extrusion was impossible. Comparative Examples 3 to 7 are the cases where waxy substances beyond the scope of the present invention were used. Therefore, the common extrusion was impossible in some cases, and grains and water trees were formed in other cases. In Comparative Example 8 the amount of carbon-black was below the specified value, and the volume resistivity was too high for a semiconductive layer.

While the invention has been described in detail and with reference to specific embodiments thereof, it will be apparent to one skilled in the art that various changes and modifications can be made therein without departing from the spirit and scope thereof.

What is claimed is:

1. A semiconductive resin composition comprising 100 parts by weight of a polymer component comprising 40 to 90 wt% ethylene-based copolymer, 30 to 5 wt% ethylene-propylene rubber, and 30 to 5 wt% low molecular weight polyethylene having an average molecular weight of 1,000 to 4,000, and 40 parts by weight or more of electroconductive carbon black per 100 parts by weight of the polymer component.

2. A semiconductive resin composition as in claim 1, wherein the ethylene-based copolymer is an ethylene-vinyl acetate copolymer.

3. A semiconductive resin composition as in claim 1, wherein the ethylene-based copolymer is an ethylene-ethyl acrylate copolymer.

4. A semiconductive resin composition as in claim 1, wherein the conductive carbon black is at least one member selected from the group consisting of furnace carbon black and acetylene black.

5. A semiconductive resin composition as in claim 4, wherein the furnace carbon black has an arithmetic mean particle size of 25 to 40 mμ, iodine adsorption of 40 to 60 mg/g, and DBP oil absorption (measured by JIS A method) of 120 to 150 ml/100 g.

6. A semiconductive resin composition as in claim 1, wherein the composition further comprises an antioxidant.

7. A semiconductive resin composition as in claim 6, wherein the antioxidant is 4,4'-thio-bis(3-methyl-6-tert-butylphenol).

8. A semiconductive resin composition as in claim 1, wherein the composition further comprises a crosslinking agent.

9. A semiconductive resin composition as in claim 8, wherein the crosslinking agent is 1,3-bis(tert-butylperoxyisopropyl)benzene.

10. A semiconductive resin composition as in claim 1, wherein the ethylene-based copolymer is selected from the group consisting of ethylene-vinyl acetate copolymers, ethylene-ethyl acrylate copolymers and ethylene-methyl methacrylate copolymers.

11. A semiconductive resin composition as in claim 10, wherein the amount of carbon black is 40 parts to 75 parts by weight carbon black.

12. A semiconductive resin as in claim 11, wherein the conductive carbon black is at least one member selected from furnace carbon black and acetylene black.

13. A semiconductive resin composition as in claim 12, wherein the furnace carbon black has an arithmetic mean particle size of 25 to 40 mμ, iodine adsorption of 40 to 60 mg/g, and DBP oil absorption (measured by JIS A method) of 120 to 150 ml/100 g.

* * * * *